United States Patent [19]
Woog

[11] Patent Number: 5,298,170
[45] Date of Patent: Mar. 29, 1994

[54] EFFLUENT NEUTRALIZATION PROCESS AND CHAMBER

[76] Inventor: Gunter Woog, 5435 Bauers Dr., West Bend, Wis. 53095

[21] Appl. No.: 5,642

[22] Filed: Jan. 19, 1993

[51] Int. Cl.⁵ .............................................. C02F 1/66
[52] U.S. Cl. ............................... 210/719; 75/713; 75/733; 210/724; 210/738; 210/199; 210/207; 210/248; 210/912; 210/919; 266/170
[58] Field of Search .................... 75/713, 733, 741; 210/702, 714, 724, 738, 198.1, 199, 202, 205–207, 232, 719, 912, 919, 248; 266/170; 430/399, 400

[56] References Cited

U.S. PATENT DOCUMENTS

| | | | |
|---|---|---|---|
| 2,263,398 | 11/1941 | Robinson | 210/207 |
| 3,043,432 | 7/1962 | Megesi | 210/130 |
| 3,099,623 | 7/1963 | Kaufer | 210/167 |
| 3,369,801 | 2/1968 | Hartman | 266/170 |
| 3,541,008 | 11/1970 | Spinola | 210/721 |
| 3,794,171 | 2/1974 | Kimura et al. | 210/205 |
| 4,100,071 | 7/1978 | Beurer et al. | 210/197 |
| 4,240,617 | 12/1980 | MacKay | 266/170 |
| 4,331,473 | 5/1982 | King, Jr. | 75/109 |
| 4,441,697 | 4/1984 | Peterson et al. | 266/170 |
| 4,608,177 | 8/1986 | Woog | 210/738 |
| 4,662,613 | 5/1987 | Woog | 266/170 |
| 4,854,552 | 8/1989 | Williams | 266/170 |
| 4,997,166 | 3/1991 | Wiggins | 266/170 |
| 5,026,029 | 6/1991 | Peterson | 266/170 |
| 5,132,022 | 7/1992 | Woog | 210/719 |

FOREIGN PATENT DOCUMENTS 1353805  5/1974  United Kingdom.

*Primary Examiner*—Peter A. Hruskoci
*Attorney, Agent, or Firm*—Ryan, Kees & Hohenfeldt

[57] ABSTRACT

An effluent precipitation and neutralization chamber for mixing and neutralizing spent photographic developer and fixer. The fixer inlet discharging into a vertically oriented conduit located within the vessel, which contains iron therein and defines a gravity flow path for flow of the fixer within the vessel from the inlet to the bottom of the vessel. A layer of steel wool is positioned on the bottom of the vessel in the flow path of the fixer. Baffles inside the chamber promote mixing of the developer and fixer. The desilvered fluid is diluted with wash water before it is discharged from the chamber. A wash water inlet tube is aligned with an open ended vessel that surrounds the discharge outlet to dilute the mixed and neutralized developer and fixer.

8 Claims, 2 Drawing Sheets

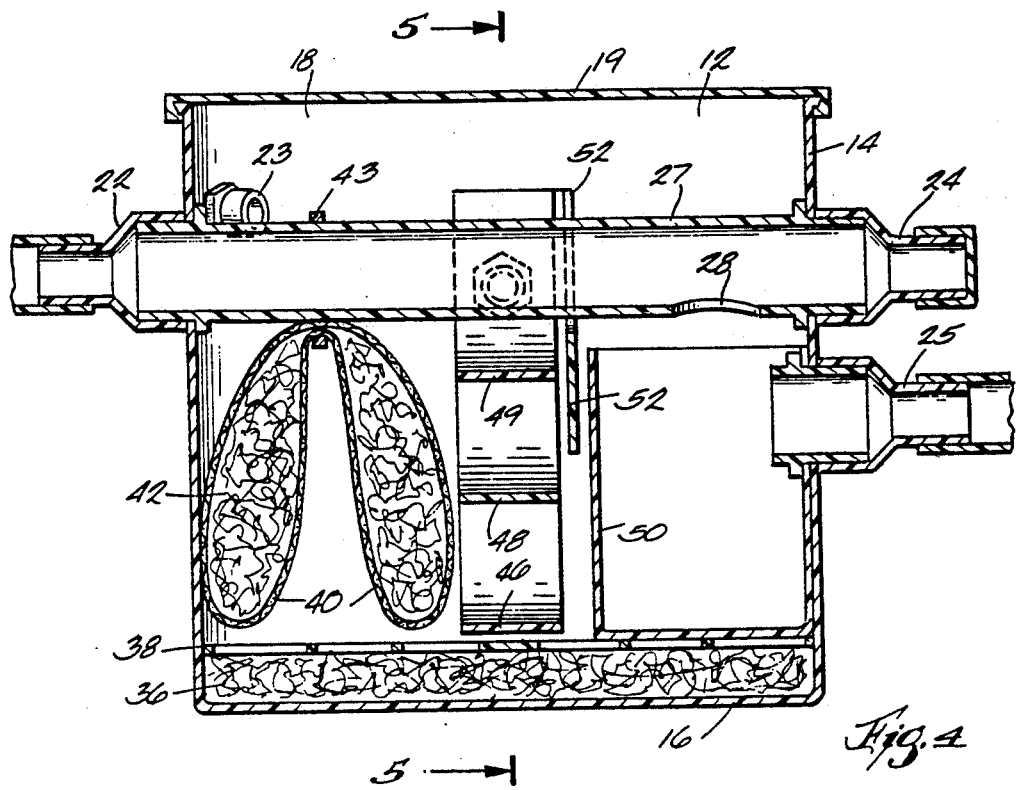
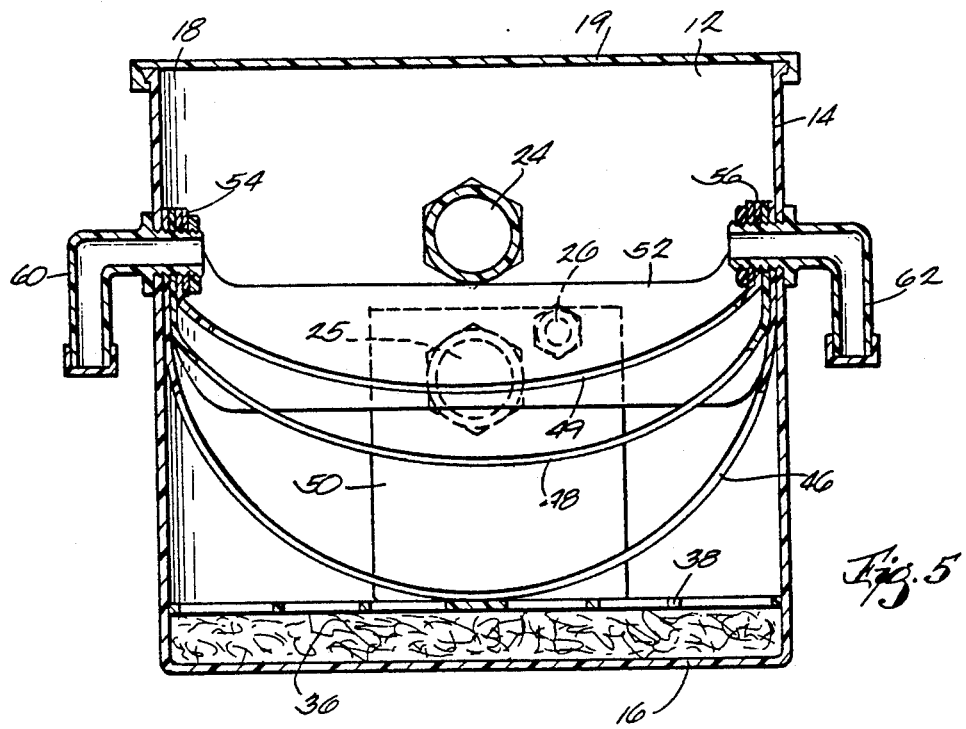

EFFLUENT NEUTRALIZATION PROCESS AND CHAMBER

BACKGROUND OF THE INVENTION

This invention pertains to waste processing, and more particularly to apparatus for treating and disposing of spent photographic fixer and developer chemicals and removing silver therefrom.

The present invention is a further development of the effluent precipitation and neutralization chamber described in Woog, U.S. Pat. Nos. 4,608,177 and 5,132,022. In these apparatus of these patents, spent photographic fixer and spent photographic developer are mixed together in a closed chamber. To assure proper mixing of the spent fixer and developer, the fluid flow paths within the chambers included baffles and materials such as plastic ribbons that caused the fluids to flow in a tortuous path. The spent fixer, which is normally acidic in nature, having a pH of about 4.5, is neutralized by the alkaline developer, which normally has a pH of about 10.5. As a result, iron in the fixer in the form of ferrous oxide is precipitated as fine particles, and a relatively neutral and clear liquid is discharged from the chamber to a drain. The iron precipitate is periodically cleaned from the chamber for proper disposal.

This invention relates to improvements over the apparatus set forth above and to solutions to the problems raised or not solved thereby.

SUMMARY OF THE INVENTION

In accordance with the present invention, a chamber having a improved efficiency for removal of silver, yet having a simplified, economical construction is provided.

Another aspect of the present invention involves providing an effluent precipitation and neutralization chamber which enables reduction of silver content in the spent photochemicals using a single apparatus. The apparatus of this invention includes fluid flow conduits provided with a source of iron therein. The apparatus further provides multiple sources of iron for contacting the effluent chemicals to ensure adequate removal of silver therefrom. In accordance with a further aspect of the invention, a mixing baffle prevents back up of the reaction products into the inlets, thereby preventing damage to the photographic developing equipment. Further, a source of iron ions is placed in the path of the photochemical fixer solution prior to mixing therewith of developer solution as it flows through the chamber.

The effluent precipitation and neutralization chamber of the present invention comprises a hollow vessel having an open top. A removable cover fits tightly over the vessel open top. Both the vessel bottom wall and the cover are flat to allow stacking of other devices on top of the chamber.

The vessel has two chemical inlet ports, one for introducing spent photographic developer and the other for introducing spent photographic fixer into the vessel. The inlet port for the fixer is positioned near the open top of the vessel and discharges into an enlarged downwardly extending conduit, which conduit contains a source of iron such as pieces of iron-containing metal. The enlarged conduit leads the fixer, by gravity flow, through the iron source to a second source of iron, preferably a layer of steel wool situated at the bottom of the chamber. After the fixer seeps through this steel wool it rises an becomes mixed with developer solution that is introduced near the top of the chamber. A series of horizontal baffles ensures adequate mixing of the treated fixer with the spent developer prior to discharge out of a drain port. Provision is also made for dilution of the neutralized chemicals with water near the discharge port.

The outlet port is lower than and on the opposite side of the vessel from the fixer and developer inlet ports. The diluting wash water is introduced into and the treated fluid is discharged from the vessel through respective tubes that pass through the vessel wall forming respective inlet and outlet ports. A mixing vessel is provided around the outlet tube and the diluting wash water is introduced directly into the mixing vessel. Consequently, dilution of the discharged fluid and washing away of any solids that tend to clog the outlet tube are readily achieved. The wash water also removes gelatinous deposits and dilutes the mixed fluid at the outlet port, thereby making it easier to meet legal discharge limits.

To provide thorough mixing of the spent developer and fixer as they flow from their respective inlet ports to the outlet port, the effluent precipitation and neutralization chamber of the present invention further comprises a vertical baffle located between the fixer and developer inlet ports and the outlet port. The baffle extends from a level a short distance below the inlets and downwardly at least to approximately the level of the mixing vessel at the outlet tube. Iron precipitate produced by the chemical reaction between developer and fixer settles to the bottom of the vessel.

To enable recovery of additional trace amounts of silver from the spent fixer, the present invention further comprises an additional source of iron ions. In the one preferred embodiment of the invention, the source of iron ions is a quantity of fine steel wool confined in a plastic mesh envelope and suspended in an elevated location within the vessel. The fluid flowing through the multiple sources of steel wool, thereby promotes iron-for-silver ion exchange by known chemical reactions.

Periodically the chamber cover is opened to remove the ferrous oxide and silver precipitates and clean the vessel and ribbons of other coatings such as gelatinous materials. In that manner, the effluent precipitation and neutralization chamber functions as a single point of service discharge for all of the chemicals from a film processing machine.

A further aspect of the invention involves providing a means for visually observing when the device is becoming backed up due to undue amounts of sediments. A still further aspect involves providing a valve for removal of periodic effluent samples from the device to assist in monitoring its performance.

Other advantages, benefits, and features of the invention will become apparent hereinafter to those skilled in the art.

BRIEF DESCRIPTION OF THE DRAWING

FIG. 4 is a cross-sectional view taken along Line 4—4 of FIG. 2; and,

FIG. 5 is a cross-sectional view taken along Line 5—5 of FIG. 4.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The effluent precipitation and neutralization chamber disclosed herein is particularly useful for treating spent chemicals from film processing operations. It will be understood, however, that the invention is not limited to photographic applications.

Figure 1:
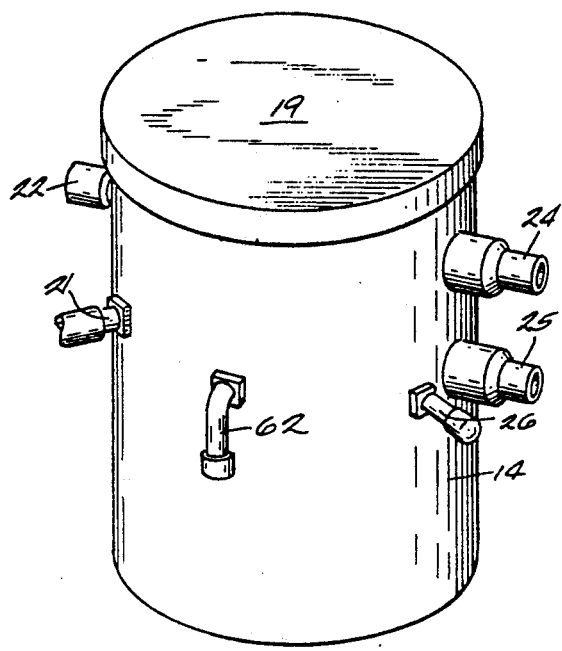
FIG. 1 is a perspective view of an effluent precipitation and neutralization chamber, constructed according to a preferred embodiment of the present invention.

Referring first to FIG. 1 an effluent precipitation and neutralization chamber 10 is constructed of a hollow vessel 12 having a side wall 14, a flat bottom wall 16, and an open top 18. A flat cover 19 fits tightly on the vessel open top 18, but the cover is removable. The flat bottom wall 16 and flat cover 19 enable other vessels or devices to be stacked on the top of the chamber 10.

The vessel wall 14 is formed with fluid inlet ports that preferably are located close to each other and near the vessel open top 18. Through one inlet port pass®s a suitable tube 21 that introduces spent photographic fixer into the vessel 12. A similar tube 23 passes through the vessel wall at the second inlet port to introduce spent photographic developer into the vessel.

Third and forth inlet ports 22 and 24 are formed in the vessel wall 14 to provide alternative means to introduce wash water into the vessel 12. One or the other of ports 22 and 24, which form the opposite ends of a wash water conduit 27, is used and the other capped as seen in FIG. 4. Conduit 27 is provided with an opening 28 for discharge into the vessel of water. An outlet tube 25 also passes through the vessel wall for discharge of treated, diluted effluents to a drain. A sampling port 26 can be provided either on the outflow line 25 or on the side of chamber 12, as shown, in the vicinity of the outlet opening.

Figure 3:
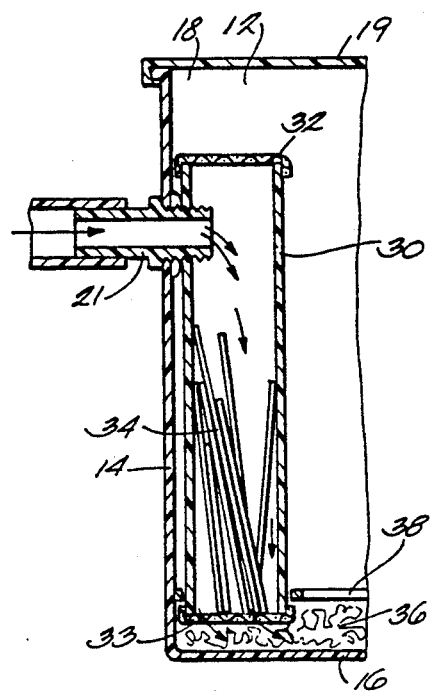
FIG. 3 is a fragmentary sectional view taken along offset line 3—3 of FIG. 2.
Figure 2:
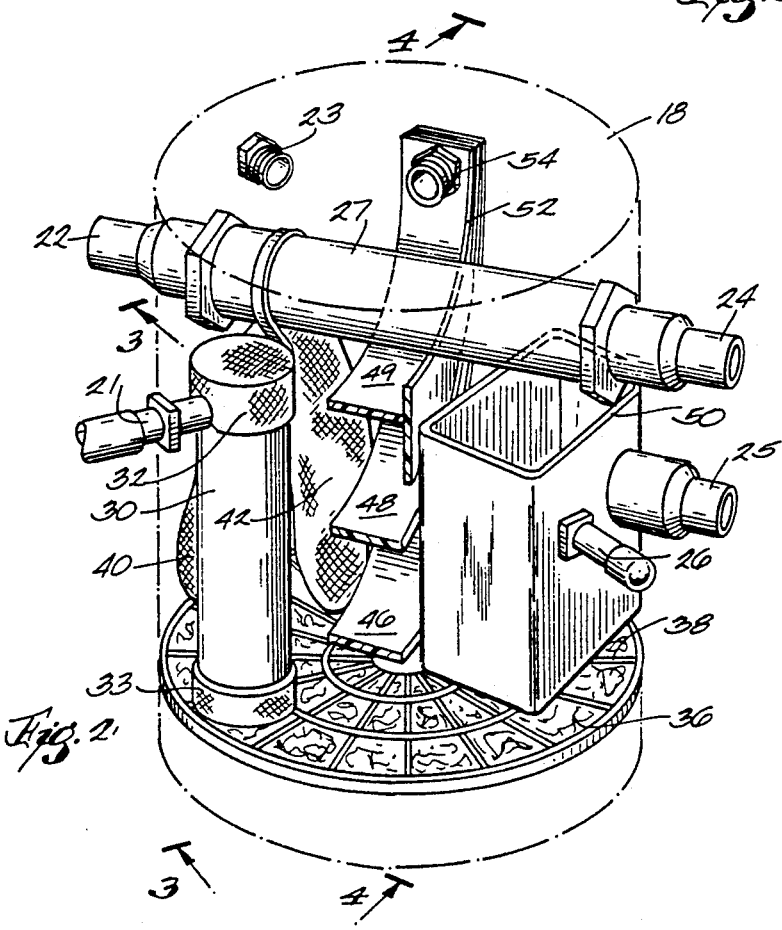
FIG. 2 is a perspective view of the interior components of the chamber with some parts shown in section for clarity.

As seen in FIGS. 2 and 3, inlet 21 discharges into the top of a larger, downwardly extending conduit 30, which conveys the spent fixer, by gravity flow, to the bottom of vessel 12. Conduit 30 may be provided with a plastic mesh closures 32 and 33 at its top and bottom, respectively, and contains within it a plurality of iron-containing metal pieces 34, which act to precipitate silver ions out of the spent fixer liquid. Conduit 30 directs the flow of the fixer down into a layer of steel wool 36 located on the bottom 16 of vessel 12. Steel wool 36 provides a further source of ferrous ions for further removal of silver from the spent fixer. Steel wool 36 can be held in place by a plastic grate 38, which is suspended above bottom 16.

As vessel 12 fills with spent chemicals, the fixer rises out of steel wool 36. A mesh bag 40 containing additional steel wool 42 is suspended within vessel 12, for example on wash water pipe 27 by means of a plastic distrap 43. Steel wool 42 provides a third source of ferrous ions to remove remaining traces of silver from the effluents being treated. Note that due to the placement of spent developer inlet near the top of vessel 12, the developer will tend to react with the treated fixer effluent after it has flowed in contact with the above-described sources of ferrous ions. To promote mixing of the fixer and developer, a number of baffles 46, 48 and 49 are positioned laterally across the vessel 12. The baffles restrict the flow of the fixer and form a tortuous flow path to assist in mixing of the fixer and developer to ensure a complete neutralization reaction. Such mixing neutralizes the normally acidic fixer and the normally alkaline developer.

Spent fixer, even after undergoing a desilvering process, typically contains about 500 to 1000 parts per million of iron besides about five to 500 parts per million of silver. Hence another result of the chemical reaction between the acidic fixer and the alkaline developer is that ferrous oxide is precipitated from the fixer. The ferrous oxide settles silver particles, and gelatinous materials to the bottom of the vessel. In that manner, the fluid discharged from the outlet tube 25 is both relatively neutral in pH concentration and clear of iron precipitate.

A dilution chamber 50 is provided around outlet 25. Diluting wash water is directed through opening 28 directly into chamber 50.

In order for the spent fixer and developer from the inlet tubes 21 and 23, respectively, to reach the outlet tube 25, the fixer and developer must flow under a baffle 52. The baffle 52 extends diametrically across the chamber vessel 12 between the inlet tubes 21 and 23 and the outlet tube 25. The baffle prevents a short circuit flow of liquids in the event of partial plugging of the unit and further promotes mixing of the fixer and developer as they flow through the vessel 12. Preferably the vessel 12 is formed from a plastic material, and baffles 46, 48, 49 and 52 may be formed from plastic such as polyvinylchloride or polyethylene, but other materials such as wood or glass could be substituted. As shown in FIG. 5, baffles 46, 48, 49 and 52 are all preferably attached to the side wall 14 at opposite ends, for example by means of being fastened by nuts 54 and 56 that also attach a pair of visual indicators 60 and 62 to the opposite sides of wall 14. Visual indicators 60 and 62 are provided to alert the operator that the chamber 12 is becoming filled with sediment and requires replacement. The indicators, initially empty, becomes filled with a dark fluid, which serves as a warning.

Periodically, the interior of the chamber is visually inspected. After use, the entire unit can be refined in a metallurgical furnace to recover metallic silver and iron. As the chamber fills with sediment, there exists a possibility that fluids can back up into the inlet lines 21 or 23, potentially damaging the other equipment to which they are connected. The present device avoids this problem by positioning of the top of baffle 52 below the level of the inlets 21 and 23. The backed up fluids will thus flow over the top of the baffle directly to outlet 25, instead.

An important advantage of the effluent precipitation and neutralization chamber 12 is that it serves as an improved single point of service discharge for all the chemicals of a film processing machine. Further, by the principles of dilution from the wash water entering the vessel 12 through the tube 27, silver concentration can be significantly reduced, thereby making legal discharge limits much more obtainable than with prior treatment systems. The recovery of silver from the spent photographic fixer is another important feature of the present invention.

Thus, it is apparent that there has been provided, in accordance with the invention, an effluent precipitation and neutralization chamber that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An effluent precipitation and neutralization chamber for treating spent photographic fixer and developer comprising:

a vessel having a wall and an open top;

a cover for removably covering the vessel open top;

inlets in the vessel wall for introducing the spent photographic developer and fixer into the vessel;

an outlet in the vessel wall;

the fixer inlet discharging into a vertically oriented conduit located within the vessel, said conduit containing an iron containing material therein in an amount effective to precipitate silver from said fixer solution and defining a gravity flow path for flow of the fixer within the vessel from the inlet to the bottom of the vessel;

a layer of steel wool positioned on the bottom of the vessel in the flow path of said fixer;

the inlet for said developer being located adjacent to the top of the vessel;

the flow path through the vessel between the inlet means and the outlet providing mixing of the developer and fixer as they flow from the inlets to the outlet to thereby neutralize the developer and fixer, said flow path comprising a plurality of baffles;

a wash water inlet for introducing wash water into the vessel adjacent to the outlet to dilute the mixed photographic developer and fixer discharged from the vessel through the outlet.

2. The effluent precipitation and neutralization chamber of claim 1 further comprising a third source of iron ions within the vessel for reacting with the photographic fixer to exchange silver ions in the fixer for iron ions from the source of iron ions, so that silver is removed within the vessel from the photographic fixer.

3. The effluent precipitation and neutralization chamber of claim 2 wherein the source of iron ions comprises steel wool.

4. Apparatus for treating selected chemicals comprising:

a vessel having a wall and an open top;

cover mans for removably covering the vessel open top;

fluid inlets in the vessel wall for introducing at least two selected spent photographic chemicals that are reactive with each other into the vessel one of said chemicals comprising photographic fixer;

a fluid outlet in the vessel wall for discharging the chemicals from the vessel;

one of the inlets discharging into a vertically oriented conduit located within the vessel, said conduit containing as source of iron-containing material in an amount effective to precipitate silver from said photographic fixer and defining a gravity flow path for flow of the fixer within the vessel from the inlet to the bottom of the vessel;

a layer of steel wool positioned on the bottom of the vessel in the flow path defined by said conduit;

another inlet being located adjacent to the top of the vessel;

the flow path through the vessel between the fluid inlets and the outlet providing mixing of the liquids as they flow from the inlet means to the outlet to thereby neutralize the liquids, said flow path comprising a plurality of baffles;

the outlet extending through the vessel wall and having opening for outflow of mixed, reacted liquids from the vessel; and means for introducing wash water into the vessel proximate said outlet, so that wash water introduced into the vessel dilutes the reacted liquids flowing out of said outlet.

5. Apparatus according to claim 4 wherein at least one of said baffles extends across the vessel between the inlets and the outlet with its top below the inlets.

6. A method of neutralizing spent photographic fixer and reducing waste silver content thereof comprising the steps of:

introducing spent photographic developer and spent photographic fixer into a vessel having an inlet discharging said fixer into a vertically oriented conduit located within the vessel, said conduit defining a gravity flow path for flow of the fixer within the vessel from the inlet to the bottom of the vessel, said conduit containing an iron containing material therein in an amount effective to precipitate silver from said fixer solution;

providing a second source of iron ions in the flow path of said fixer adjacent to the bottom of said vessel;

contacting the photographic fixer with the source of iron ions to cause an exchange of ions between the source of iron ions and the photographic fixer and thereby remove silver from the spent photographic fixer while reducing pollutant content;

mixing the spent photographic developer and spent photographic fixer within the vessel along a flow path comprising a plurality of baffles to neutralize the pH thereof;

introducing wash water into the resultant neutralized liquids proximate to the outlet, and discharging the mixed spent solution having reduced pollutant content through said fluid outlet while causing wash water to also flow through said outlet.

7. The method of claim 6 wherein providing a source of iron ions comprises providing fine steel wool within the vessel.

8. An effluent precipitation and neutralization chamber for treating spent photographic fixer and developer comprising:

a vessel defining an enclosure;

inlets in a wall of the vessel for introducing spent photographic developer and fixer into the vessel;

the fixer inlet discharging into a vertically oriented conduit located within the vessel, said conduit containing an iron containing material therein in an amount effective to precipitate silver from said fixer solution and defining a gravity flow path for flow of the fixer within the vessel from the inlet to the bottom of the vessel;

a layer of steel wool positioned on the bottom of the vessel in the flow path of said fixer;

the inlet for said developer being located adjacent to the top of the vessel;

a mesh container containing steel wool suspended within said vessel;

an outlet in a wall of the vessel comprising an outlet tube extending through the vessel wall and terminating in an open enclosure within the vessel;

a series of horizontally oriented baffles in said vessel for providing a tortuous path to the flow of the fixer within the vessel, said flow path causing thorough mixing of the developer and fixer as they flow from the inlets to the outlet to thereby neutralize the developer and fixer, a wash water inlet for introducing wash water into the open enclosure to dilute the mixed photographic developer and fixer discharged from the vessel through the outlet, said wash water inlet including a tube extending through the vessel wall and terminating in an opening that faces and is proximate to the open end of the enclosure.

* * * * *